(No Model.)

J. KNIGHT.
ADJUSTABLE CONE CENTER FOR LATHES.

No. 412,926. Patented Oct. 15, 1889.

Witnesses,
Geo. H. Strong

Inventor,
John Knight
By Dewey & Co.
Attys

UNITED STATES PATENT OFFICE.

JOHN KNIGHT, OF SAN FRANCISCO, CALIFORNIA.

ADJUSTABLE CONE-CENTER FOR LATHES.

SPECIFICATION forming part of Letters Patent No. 412,926, dated October 15, 1889.

Application filed June 7, 1889. Serial No. 313,516. (No model.)

*To all whom it may concern:*

Be it known that I, JOHN KNIGHT, of the city and county of San Francisco, State of California, have invented an Improvement in Adjustable Cone-Centers for Lathes; and I hereby declare the following to be a full, clear, and exact description of the same.

My invention relates to the class of lathe attachments, and especially to the class of cone-centers therefor; and my invention consists in the hereinafter-described cone-center having peculiarly-adjustable jaws.

The object of my invention is to adapt the cone-center to pieces of work which have an open center or hole, and which have to be trued from the outside irrespective of the inside.

Figure 1:
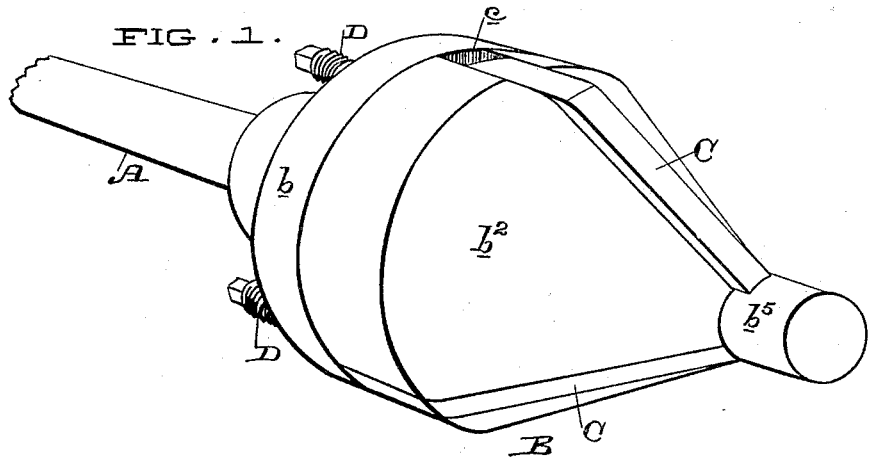
Figure 2:
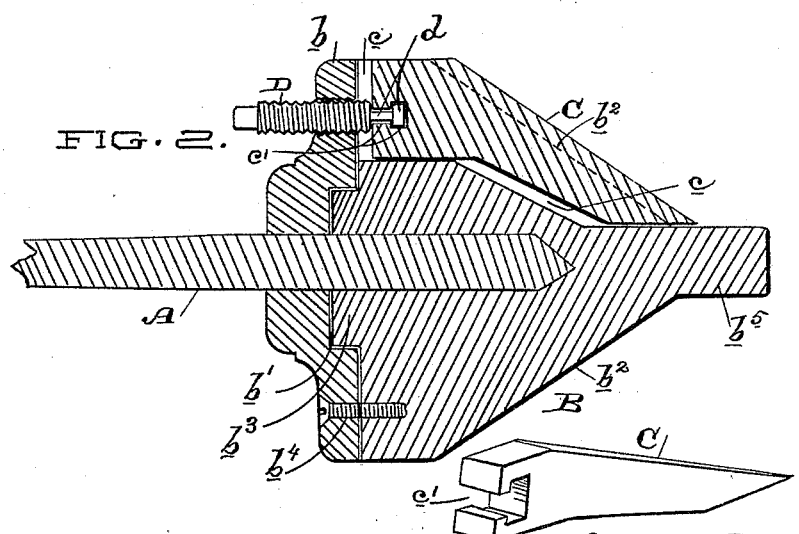
Figure 3:
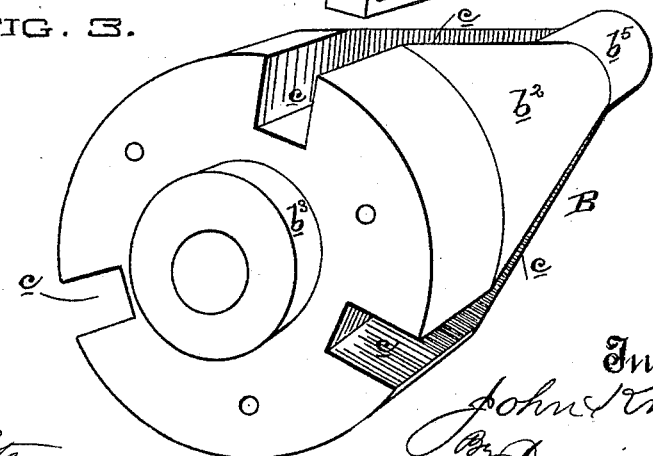

Referring to the accompanying drawings for a more complete explanation of my invention, Figure 1 is a perspective view of my cone-center, one of the jaws being shown projected. Fig. 2 is a vertical longitudinal section. Fig. 3 is a perspective view of the conical-shaped piece $b^2$ and one of the jaws C about to be inserted in its seat.

A is the lathe-center.

B denotes the generally conical body of the cone-center. This consists of a centrally-perforated plate $b$ and a cone-shaped piece $b^2$, the two fitting together by a corresponding recess $b'$ in the plate and a tongue $b^3$ in the base of the cone-shaped piece, and bolted together by the bolts $b^4$. The cone-shaped piece has a cylindrical point or extension $b^5$. In the cone-shaped piece are made grooves $c$, which form the seats for the adjustable or sliding jaws C. These grooves are located in radial planes, and are open at the periphery of the cone and extend down into it, as shown. Into these grooves are fitted the jaws C, which are plates having a shape corresponding to that of the grooves, and having formed in their rear edges the T-shaped sockets or grooves $c'$, into which fit the correspondingly-shaped heads $d$ of the adjusting-screws D, which are seated in the plate $b$ and extend outwardly therefrom, so as to be readily handled. When these screws are turned backwardly, so as to draw the jaws inwardly to their limit, the outer edges of said jaws lie flush with the periphery or face of the cone; but when the screws are turned inwardly, so as to force the jaws forward, their edges move out from and beyond the periphery or face of the cone. In this movement the jaws travel on the bases of the grooves $c$, in which they are seated, and their extreme points or forward ends travel on the cylindrical extension $b^5$ of the cone-shaped piece $b^2$, which forms thereby a guide for them. The cone-shaped piece is centrally perforated, so as to admit the whole device being fitted upon the lathe-center A. Now, when the jaws C are retracted so that their edges lie flush with the periphery or face of the conically-shaped piece $b^2$, the latter serves as an ordinary cone-center; but when a piece of work is put in the lathe which requires to be turned true from the outside without respect to the inside or central hole or cavity which it may have, then the jaws are properly set out independently of each other, to fit and bind upon the open center or hole of the piece of work and hold it so that its outside can be turned true.

Having thus described my invention, what I claim as new, and desire to secure by Letters Patent, is—

1. In a cone-center for lathes, the combination of a plate $b$, the conically-shaped piece $b^2$, bolted thereto and having radial grooves $c$ in its periphery or face, said plate and piece being centrally perforated to receive the lathe-center, the movable jaws C, seated in said grooves and adapted to be projected from the periphery or face of the conically-shaped piece and retracted, and the screws D, seated in the plate and engaging the jaws, whereby they are operated, substantially as described.

2. In a cone-center for lathes, the conically-shaped body thereof having a cylindrical point or extension $b^5$ and provided with grooves in radial planes, as described, in combination with the sliding jaws C, mounted in said grooves and having their forward ends guided by the cylindrical extension of the cone-shaped body, and the screws seated in said body and engaging the rear ends of the jaws for operating them, substantially as described.

In witness whereof I have hereunto set my hand.

JOHN KNIGHT.

Witnesses:
S. H. NOURSE,
H. C. LEE.